April 21, 1953    S. P. ROBINSON    2,635,950
PROCESS OF MAKING ALUMINA PEBBLES
Filed April 26, 1948

INVENTOR.
S.P. ROBINSON
BY Hudson & Young
ATTORNEYS

Patented Apr. 21, 1953

2,635,950

UNITED STATES PATENT OFFICE 2,635,950

PROCESS OF MAKING ALUMINA PEBBLES

Sam P. Robinson, Bartlesville, Okla., assignor to Phillips Petroleum Company, a corporation of Delaware Application April 26, 1948, Serial No. 23,245

11 Claims. (Cl. 23—313)

The invention relates to the manufacture of alumina pebbles of high purity for use in pebble heaters and in other heat exchange applications. A specific aspect of the invention pertains to a method of manufacturing alumina pebbles having high resistance to cyclic thermal and mechanical shock.

Pebble heater techniques being developed and applied to various gas heating and reaction processes at the present time make use of a compact stream of small refractory pebbles as a moving heat exchange medium. These pebbles which are usually ceramic materials, although they may be metallic for some applications, are spheres ranging in size from about ⅛" to 1", preferably about ¼" to ¾" in diameter. In typical pebble heater operation, a continuous compact mass of pebbles descends by gravity through a series of treating zones and upon emerging from the lowermost zone, they are elevated by a suitable elevator, usually of the bucket type, to a point above the uppermost zone for recycling through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute. In addition to the severe thermal shock resulting from such rapid temperature changes, the pebbles are subjected to considerable mechanical shock in passing through the apparatus and, especially, in the elevator equipment and in dropping from the top of the elevator into the top of the pebble heating zone. It is found that considerable breakage and loss of pebbles occurs when using conventional commercial pebbles under such severe conditions of operation. Pebbles which have been made from powdered alumina by wetting the powder and rolling the material in conventional balling equipment until balls of the proper size have been formed are found to exhibit laminar structure and suffer breakage under the strain of pebble heater operating conditions. Pebbles which are made by slugging and compacting the slugs into spheres do not exhibit this laminar structure and are much more resistant to breakage under pebble heater operation. However, it has been found that pebbles made by slugging and compacting the slugs into balls must be fired within a rather critical temperature range for a time sufficient to effect suitable bonding of the crystals, if cracking and breakage of the pebbles are to be reduced to a minimum when the pebbles are subjected to cyclic thermal and mechanical shock conditions. The critical temperature range for firing or calcining the high purity alumina pebbles is between 3000 and 3150° F. with a narrower more effective range of from 3050 to 3100° F. A firing time of at least one hour and up to 30 hours may be used in order to properly bond the alumina crystals and stabilize crystal growth.

The preferred method of forming a strong bond between the alumina crystals in a high purity alumina pebble is to incorporate in the pebble from 70 to 95 per cent by weight of alpha corundum and from 5 to 30 per cent of hydrated alumina. Both types of alumina should be at least 99 per cent pure alumina and preferably 99.5 per cent alumina. A typical analysis of alpha corundum suitable for the process is the following:

| | Per cent |
|---|---|
| $Al_2O_3$ | 99.5 |
| $Na_2O$ | 0.20 |
| $Fe_2O_3$ | 0.25 |
| $SiO_2$ | 0.05 |

The alpha corundum which constitutes the major portion of the pebble raw material can be made from any aluminum oxide material by suitable purification and should be precalcined at a temperature in the range of 1800 to 2200° F. for best results. Any of the substantially pure alumina hydrates are suitable for the hydrated alumina raw material, e. g., the alumina manufactured by the Bayer process. By forming a mixture of the two aluminas of the proportions stated hereinabove and compacting the same into balls and calcining or firing at a temperature of 3000 to 3150° F. for a period of 1 to 30 hours, an unusually strong bond between the alumina crystals is effected.

The objects of the invention are several:

To provide a method of improving high purity alumina pebbles so as to make them extremely rugged and resistant to cyclic thermal and mechanical shock to which they are subjected in pebble heater operation;

To provide a method of heat treating alumina pebbles which develops a strong bond and stabilizes crystal growth;

To provide a method of manufacturing heat and shock resistant alumina pebbles which avoids effecting a laminar structure in the pebble with attendant spalling and breakage under pebble heater operating conditions;

To provide an effective method of bonding the alumina crystals in a high purity alumina pebble; and To provide an improved high purity alumina pebble having high resistance to cyclic heat and mechanical shock.

Other objects of the invention will become apparent from a consideration of the accompanying disclosure.

In compacting pebbles according to the invention, a plastic mix or paste is formed of powdered alpha corundum and powdered hydrated alumina with a suitable amount of water. The alpha corundum is best suited to the process when not fired above a temperature of about 2500° and more suitable when fired in the range of about 1000 to 2200° F. for a sufficient time to convert all of the gamma alumina to alpha alumina; both types of alumina should be comminuted to a particle size in the range of about 200 to 400 mesh, preferably about 325 mesh. In order to form a homogeneous mix or paste, it is desirable to treat the mixture in a ball mill for an extended period until the mix is homogeneous and plastic. After the mix is prepared, it is dried or otherwise dewatered to a moisture content in the range of 15 to 25 per cent by weight in order to provide suitable consistency for extrusion. The partially dried mix or paste is then extruded through dies in either a piston or screw type extrusion press into long macaroni type cylinders or rods which are automatically cut off into short lengths upon emerging from the extrusion die. Drying the paste to a moisture content between 15 and 25 per cent is necessary in order to permit proper extrusion of the paste and a moisture content of from 17 to 19 per cent is preferred for best performance in this step. When making pebbles of a given diameter, the extruded rods are cut into slugs of a length approximately equal to the diameter of the rod. In this way, pebbles of the approximate diameter of the rod will result, e. g., when ⅜" pebbles are desired, the alumina paste is extruded into rods approximately ⅜" in diameter and then cut into slugs ⅜" long. High pressure extrusion of this type, with or without deairing of the feed, is much preferred to other ways of preparing the slugs for the pebble balling operation to follow, inasmuch as a homogeneous body results with minimum variations in structure after firing. However, other methods of preparing the slugs are within the scope of the invention.

The moisture content of the alumina paste during the extrusion step is important because when it amounts to less than 15 per cent, the slugs formed from the extruded rods are not completely homogeneous in structure and will result in the formation of an inferior pebble. If the moisture content exceeds 25 per cent, the extruded rod is too sticky and the slugs cannot be handled properly in the subsequent balling step.

Following the cutting of the extruded alumina into slugs, the slugs are dried to a moisture content between 10 and 15 per cent by weight before rolling or compacting into balls which is the next step of the operation. A preferred moisture content for this step lies between 11.5 and 13 per cent. Wetter slugs tend to ball up and stick together, while drier slugs roll up into balls which develop internal cracks upon firing. Compacting of the alumina slugs into balls or pebbles can be performed in several ways. Rolling of the slugs in a balling machine utilizing three dimensional rotation in a cylindrical drum placed at angles to all three axes of conventional rotary equipment is found to make the most suitable pebbles upon firing. The balls are more firmly compacted and more nearly spherical in shape than when made by any other known method. This is probably due to the fact that the slugs are rolled in all directions during the rolling or compacting step. The resulting spherical pebbles with proper moisture content do not stick together and may be stored temporarily or transferred directly to the next step which is the firing operation.

The firing temperature required to produce rugged alumina pebbles resistant to thermal and mechanical shock in pebble heater operation is rather critical and is found to be in the range of 3000 to 3150° F. The initial phase of the firing step amounts to a drying step in which the free moisture is driven from the pebbles. This occurs before the pebbles rise very much above 212° F. in temperature. On further heating, as the temperature approaches 1000° F., the hydrated alumina in the pebble is converted to gamma alumina and then to alpha alumina (corundum). Crystal growth begins to occur at temperatures around 2500° F., the smaller crystals gradually recrystallizing into larger crystals which bond the preferred alumina crystals together. Larger crystals grow at the expense of smaller ones and gradually become attached to and eventually absorb the alpha alumina crystals. The resulting bond is very critical to the durability of the pebble when subjected to pebble heater operating conditions. It is believed that the bonding interstitial crystals formed from the hydrate grow at the expense of each other and interlock with the crystals of the precalcined alpha alumina to form an extremely strong bond. However, at temperatures above about 3150° F., crystals grow to such size that practically all small crystals are eliminated from the system and the pebble is a mixture of large crystals with large cleavage facets that do not stand up well under cyclic heat and mechanical shock treatment.

The firing must be continued in the range of 3000° to 3150° F. until 75 per cent of the crystals are above 5 microns in size, but no more than 5 per cent are above 30 microns in size, which requires a firing time in the temperature range recited of between 1 and 30 hours. The most durable pebbles are obtained by firing in a preferred range of 3050 to 3100° F. for a period between 4 and 24 hours.

As the calcination or firing temperature reaches 3000° F., continued firing results in shrinkage of the pebble and reduction in porosity with increase in strength and density and crystal size. Firing or calcination of the pebbles can be suitably effected in any conventional equipment which results in maintaining the entire mass of pebbles at an even temperature in the range specified during the calcination or commercial firing of these pebbles. Batch firing in continuous shaft kilns produces pebbles which are inferior for service in pebble heater operation because they are not uniformly heated in all parts of the bed, a large proportion of the pebbles being either underfired or overfired. The former are not strong and stand up poorly to both heat and mechanical shock while the latter are too rigid and soon develop large cracks along large crystal faces which results in early breakage in service.

Because of frequent shutdowns of pebble heater apparatus due to excessive breakage of commercial pebbles, a pebble testing technique simulating cyclic conditions of heating, cooling, and mechanical shock experienced in pebble heater operation was developed and is hereinafter referred to as a cyclic fatigue test. The test entails heating a stream of pebbles at a rate of approximately 1500° F. per minute to a temperature of about 2600° F., then cooling the pebbles from a temperature of about 2000° F. to about 500° F. (a range of 1500° F.) in about 1/3 of a minute. The pebbles suffer a temperature drop of about 600° F. between the furnace exit and the cooling zone where high velocity streams of cool air are directed onto the pebbles causing the sudden cooling referred to. The cooled pebbles are then elevated in a bucket elevator to a position about 3½ feet above a corundum furnace brick onto which they are dropped so as to simulate mechanical shock involved in pebble heater operation. Broken pebbles are removed from the system and are replaced with marked pebbles so as to maintain the length of cycle constant, which is about four minutes. The subject matter pertaining to pebble testing apparatus and procedures is disclosed and claimed in the copending application of R. R. Goins and myself, Serial No. 64,936, filed on December 13, 1948.

For test purposes a batch of high purity ⅜" spherical alumina pebbles is divided into six portions and the different portions are fired at temperatures of 2950°, 3000°, 3050°, 3100°, 3150° and 3200° F. for 24 hours. Pebbles from each portion are then subjected to the fatigue test referred to hereinbefore to determine resistance to breakage under conditions similar to those existing in pebble heater operation. The total and unavailable porosity of pebbles from each portion are determined by conventional methods. Also, the crushing strength of pebbles from each portion is determined as measured by the average hydraulic pressure required to crush a pebble when applied to parallel steel plates between which the pebble is crushed. Examination of the crystal structure of pebbles from the portions heated in the range of 3000° to 3150° F. shows that at least 75 per cent of the crystals are above 5 microns in size and less than 5 per cent are above 30 microns.

Results of the tests are illustrated in the drawing of which:

Figure 1:
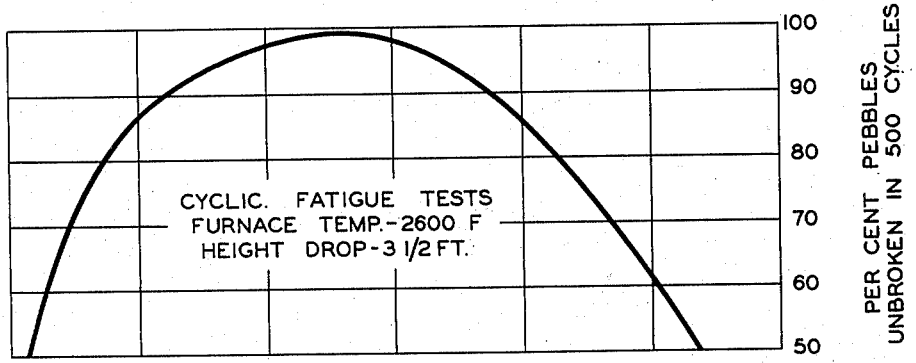
Figure 1 is a curve showing the relation between the per cent of high purity alumina pebbles remaining unbroken after 500 cycles in the fatigue test and the firing temperature of the pebbles. Tests on pebbles fired at 2950° and 3200° F. are not carried beyond 50% breakage.
Figure 2:
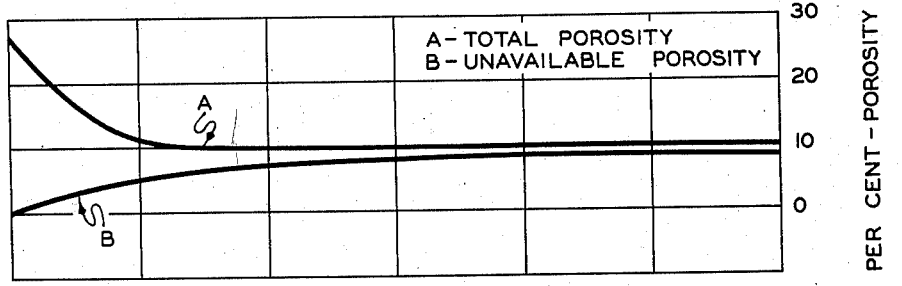
Figure 2 is a graph showing the total porosity (curve A) and the unavailable porosity (curve B) of the alumina pebbles fired at the different temperatures.
Figure 3:
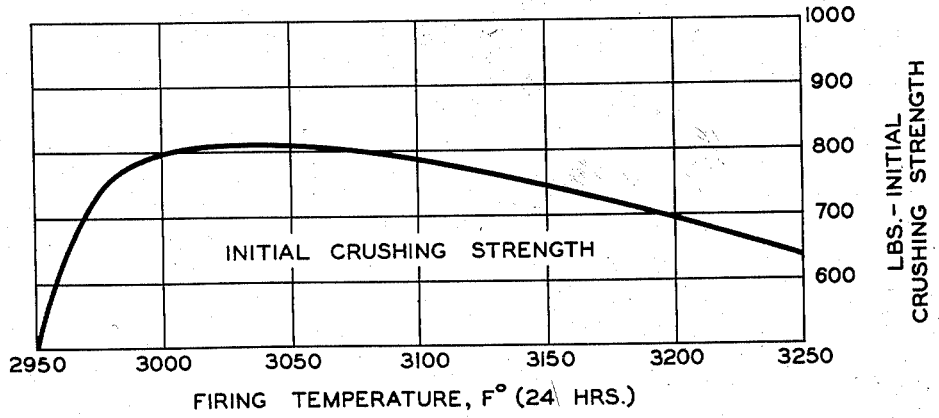
Figure 3 is a curve showing the crushing strength of the alumina pebbles from each portion.

The data presented in the drawing clearly illustrate the superior characteristics of pebbles fired in the narrow range of 3050° to 3100° F. For high purity alumina pebbles fired in this range the per cent remaining unbroken after 500 cycles of the fatigue test is about 97 or 98%. In the broader range of 3000° to 3150° F. breakage amounts to less than about 15% in 500 cycles.

From about 2950° to 3000° F. the total porosity of the pebbles decreases rather sharply while the unavailable porosity more gradually increases to approach a stable minimum and maximum, respectively, of about 10 and 8%. Of course the efficiency of the pebbles in transferring heat in a pebble heater process is determined in part by their density. In general, the more porous the pebbles, the slower is transfer of heat therethrough and the lower the heat capacity of a given volume of pebbles.

Another advantage obtained by the heat treatment of the invention in the range of 3000 to 3150° F. is in the development of the maximum strength of the pebbles as measured by resistance to crushing. Strength is one of the important characteristics of a superior pebble and correlates fairly closely with resistance to fatigue in service.

Pebbles of the invention have superior properties for use at all temperatures up to at least 3000° F. They have high heat capacity and high resistance to crushing, abrasion, and fatigue in service. They are smooth, hard, dense, and substantially spherical.

Various modifications of the invention will become apparent to those skilled in the art. The illustrative details disclosed are not to be construed as imposing unnecessary limitations on the invention which is limited only by the claims.

I claim:

1. A process for manufacturing heat and shock resistant alumina pebbles which comprises compacting spheres from a homogeneous aqueous paste of which the solid material consists essentially of 200 to 400 mesh alumina of at least 99 per cent purity comprising 70 to 90 weight per cent alpha corundum and 5 to 30 weight per cent hydrated alumina, drying the spheres, and calcining the dried spheres at a temperature in the range of 3000 to 3150° F. for a time in the range of 1 to 30 hours.

2. The process of claim 1 in which the temperature is between 3050 and 3100° F. and the time is between 4 and 24 hours.

3. A process for manufacturing alumina pebbles having high resistance to heat and mechanical shock which comprises forming a homogeneous aqueous paste of 200 to 400 mesh alumina comprising from 70 to 95 weight per cent alpha corundum of at least 99 per cent purity and from 5 to 30 weight per cent hydrated alumina of at least 99 per cent purity, drying the paste to a water content between 15 and 25 weight per cent, extruding the alumina into rods between ⅛" and 1" in cross-section, cutting the same into slugs between ⅛" and 1" in length, drying said slugs to a water content between 10 and 15 weight per cent, shaping the resulting slugs into spheres, drying the same, and calcining the dried spheres at a temperature between 3000 and 3150° F. for a time between 1 and 30 hours.

4. The process of claim 3 in which the temperature is between 3050 and 3100° F. and the time is between 4 and 24 hours.

5. A process for manufacturing pebbles having high resistance to heat and mechanical shock which comprises forming a homogeneous aqueous paste of finely divided high-purity alumina consisting essentially of 70 to 95 weight per cent alpha corundum and from 5 to 30 weight per cent hydrated alumina, drying the paste to a water content between 15 and 25 weight per cent, forming the partially dried alumina into small slugs, drying said slugs to a water content between 10 and 15 weight per cent, compacting same into spheres, drying same, and calcining the dried spheres at a temperature between 3000 and 3150° F. for a time of 1 to 30 hours so as to transform hydrated alumina into alpha corundum crystals and effect crystal growth until at least 75 weight per cent of the crystals are at least 5 microns in size and not more than 5 weight per cent are over 30 microns.

6. A process for manufacturing alumina pebbles predominating in strongly bonded alpha corundum crystals stabilized against further growth at temperatures up to 3100° F. and having high resistance to thermal and mechanical shock, which comprises forming a homogeneous aqueous paste of 200 to 400 mesh alumina consisting essentially of between 70 and 95 weight per cent alpha corundum and between 5 and 30 weight per cent hydrated alumina, the purity of the alumina in each constituent being at least 99 per cent; drying the paste to a water content of 17 to 19 weight per cent; extruding the partially dried alumina into rods of ⅛" to 1" in cross-section; cutting the rods into slugs of a length approximating their cross-section; drying the slugs to a moisture content of 11.5 to 13 weight per cent; shaping the resulting slugs into balls by rolling and tumbling; drying the balls; and calcining the dried balls at a temperature between 3050 and 3100° F. until at least 75 weight per cent of the alumina crystals are at least 5 microns in size and not more than 5 weight per cent are above 30 microns.

7. A process for manufacturing thermal and mechanical shock resistant alumina pebbles of at least 99% purity which comprises forming a homogeneous aqueous paste of 200 to 400 mesh alumina consisting essentially of 70 to 95 weight per cent alpha alumina and 5 to 30 weight per cent hydrated alumina, drying the alumina paste to a moisture content between 10 and 15 weight per cent, forming the partially dried alumina into balls between ⅛" and 1" in diameter, drying the balls so formed, and calcining the same at a temperature between 3000 and 3150° F. for a period between 1 and 30 hours.

8. The method of claim 7 in which the temperature of calcination is between 3050 and 3100° F. and the time is between 4 and 24 hours.

9. A method of heat treating substantially pure alumina pebbles compacted from moist 200 to 400 mesh alumina consisting essentially of 70 to 90 weight per cent alpha alumina and 5 to 30 weight per cent hydrated alumina so as to improve the heat and impact resistance thereof, which comprises drying the moist pebbles and calcining the same at a temperature between 3000–3150° F. for a time between 1 and 30 hours.

10. A method of heat treating substantially pure alumina pebbles compacted from moist 200 to 400 mesh alumina consisting essentially of 70 to 90 weight per cent alpha alumina and 5 to 30 weight per cent hydrated alumina so as to develop a strong bond and stabilize the alumina crystals of the pebbles against further growth, which comprises calcining said pebbles at a temperature in the range of 3000 to 3150° F. until at least 75 weight per cent of the alumina crystals are at least 5 microns in size and not more than 5 weight per cent are over 30 microns in size.

11. An alumina pebble consisting essentially of at least 99 weight per cent alpha alumina crystals at least 70 per cent of which are in the range of 5 to 30 microns in size, said pebble having a crushing strength (based on a ⅜" pebble) of at least 700 pounds between parallel plates, a total porosity in the range of 10 to 15 per cent and unavailable porosity in the range of 5 to 8 per cent.

SAM P. ROBINSON.

References Cited in the file of this patent

UNITED STATES PATENTS

| Number | Name | Date |
|---|---|---|
| 1,662,739 | Curtis | Mar. 13, 1928 |
| 2,447,306 | Bailey et al. | Aug. 17, 1948 |